United States Patent

[11] 3,614,235

[72] Inventor Charles R. Munnerlyn
 20 Waterworks Lane, Fairport, N.Y. 14450
[21] Appl. No. 845,385
[22] Filed July 28, 1969
[45] Patented Oct. 19, 1971

[54] DIFFRACTION GRATING INTERFEROMETER
 20 Claims, 4 Drawing Figs.
[52] U.S. Cl. .................................................... 356/106
[51] Int. Cl. .................................................... G01b 9/02
[50] Field of Search ......................................... 356/106,
 111, 113

[56] References Cited
 UNITED STATES PATENTS
3,090,279 5/1963 Chisholm ..................... 356/111
3,158,674 11/1964 Woodson ..................... 356/106

Primary Examiner—Ronald L. Wibert
Assistant Examiner—T. Major
Attorney—Cumpston, Shaw & Stephens ABSTRACT: An interferometer, and preferably an infrared laser interferometer, employing a single, reflecting diffraction grating operating as both the beam splitter and the reference surface. A collimated beam from the radiation source is directed onto a surface of the diffraction grating and is diffracted into two separate beams, namely a test beam and a reference beam. The test beam is directed to the test optical system and is then reflected back, as a return beam, from the test optical system to the diffraction grating, at an angle such that a diffracted return beam is produced by the diffraction grating that coincides with the reference beam. An interference pattern is produced between the reference beam and the diffracted return beam, that can be observed, at the plane of observation, visually or recorded with an image recording device.

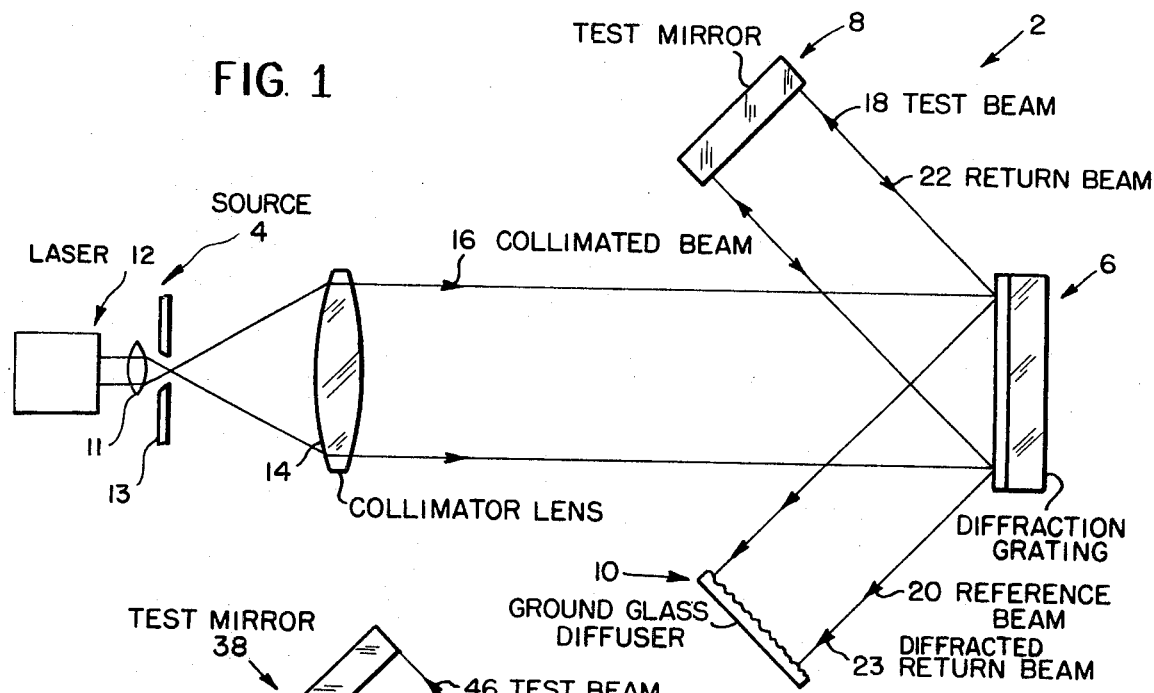
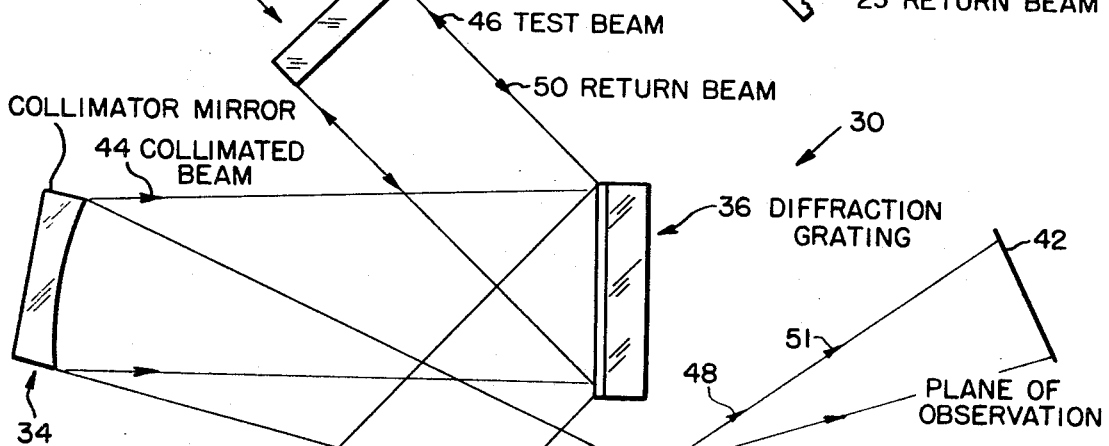

INVENTOR.
CHARLES R. MUNNERLYN
BY Cumpson, Shaw
and Stephens
ATTORNEYS

DIFFRACTION GRATING INTERFEROMETER

BACKGROUND OF THE INVENTION

1. Field of the Invention

This invention relates to interferometry and more particularly to a two-beam interferometer of the division of amplitude type, although multiple beams can also be produced.

2. Description of the Prior Art

The interferometer of the present invention has properties of both the Twyman-Green and the Fizeau interferometers, which are the most common interferometers which produce fringes of equal thickness, or Fizeau fringes. Fizeau fringes give an interference pattern which is more easily interpreted than that of a shearing type interferometer. In the Fizeau interferometer, a transmitting reference surface is placed in near contact with the test surface; whereas, in the Twyman-Green interferometer, a beam-splitter is used to separate the test and reference surfaces. The Twyman-Green interferometer is more versatile than the Fizeau interferometer, but it has the disadvantages that both the beam-splitter and reference surface must be of high optical quality and that the wide separation of the two arms make vibrational and thermal control more difficult. Also, for infrared applications, large aperture elements for beam-splitters are very expensive, and parameters such as homogeneity and wavefront deformation are now well specified for such elements.

A division of wavefront interferometer such as the Twyman-Green interferometer requires a beam-splitter in order to separate the test arm from the reference arm of the system. In the visible region of the spectrum, the most common beam-splitter consists of a glass plate with one surface coated for partial reflection. The substrate is required to be both flat and homogeneous since it is used both as a reflecting element and as a transmitting element. The absorption must be low since one beam passes through the plate three times.

The recent development of infrared lasers has made available sources of coherent radiation in the infrared spectral region. The most important laser in this spectral region is the $CO_2$ laser which emits 10.6 $\pi$m. radiation. There are many new applications for interferometry in the infrared spectral region, such as, measurement of homogeneity of infrared transmitting materials, evaluation of infrared transmitting optical systems, and measurement of the surface profile of optically rough surfaces.

Materials commonly used with $CO_2$ lasers include: barium fluoride, Irtran-2; Irtran-4; germanium, and sodium chloride. All of these materials, except for sodium chloride, absorb 10 percent or more for thicknesses greater than 1 cm. However, the latter is hygroscopic and does not maintain good surface quality when exposed to most workshop conditions. Certain plastic materials in thin sheets such as plexiglass and polyethylene show some transmission at 10.6$\pi$m. However, commercially available pellicles only have 50 percent transmission at 10.6 $\pi$m. In general, most of the infrared transmitting materials are very expensive in sizes over 2 inches in diameter. For example, a beam-splitter coated for partial reflection with a 100 mm. clear aperture at 45° will cost from about $2,000, to $8,000. Further, only values for surface flatness of such beam-splitters are given; values for the deformation produced when a plane wave passes through the material are not given.

Diffraction gratings have been used to produce interference patterns and have also been used as beam-splitters, see P. 177 of "Interferometry," by W. H. Steel, published by Cambridge University Press, 1967. However, a single diffraction grating has not been used as both the beam-splitter and the reference surface, as in the present invention.

SUMMARY OF THE PRESENT INVENTION

An interferometer comprising a single diffraction grating that accomplishes the beam-splitting while simultaneously acting as the reference surface. The diffraction grating receives a collimated beam of radiation from a radiation source and diffracts the collimated beam into a test beam directed to a test optical system, and into a reference beam directed to an interference pattern observing means. The test beam after traversing the test optical system, is reflected back (the reflected back test beam is called a return beam) from the test optical system to the diffraction grating at an angle such that a diffracted return beam is produced by the diffraction grating that coincides with the reference beam, thus producing interference between the reference beam and the return beam. An interference pattern can be observed and/or recorded at the plane of observation. The diffraction grating can be plane, concave, or convex. Preferably the incident or source beam is collimated and the diffraction grating is plane, but this arrangement is not essential. The basic arrangement of this interferometer can be modified in the manner of a Twyman-Green interferometer by adding beam divergers or other elements to the test arm for testing specialized surfaces. Further, elements can be added to the viewing arm to project an image of the test surface to different planes. The interferometer can be used, for example, for visual, photographic, thermal, or electronic image formation and viewing.

BRIEF DESCRIPTION OF THE DRAWINGS

The present invention will be more fully understood by reference to the following detailed description thereof, when read in conjunction with the attached drawings, wherein like reference numerals refer to like elements and in which:

FIG. 1 is a schematic diagram of one embodiment of the present invention;

FIG. 2 is a schematic diagram of another embodiment of the present invention.

DETAILED DESCRIPTION OF THE PREFERRED EMBODIMENT

Figure 3:
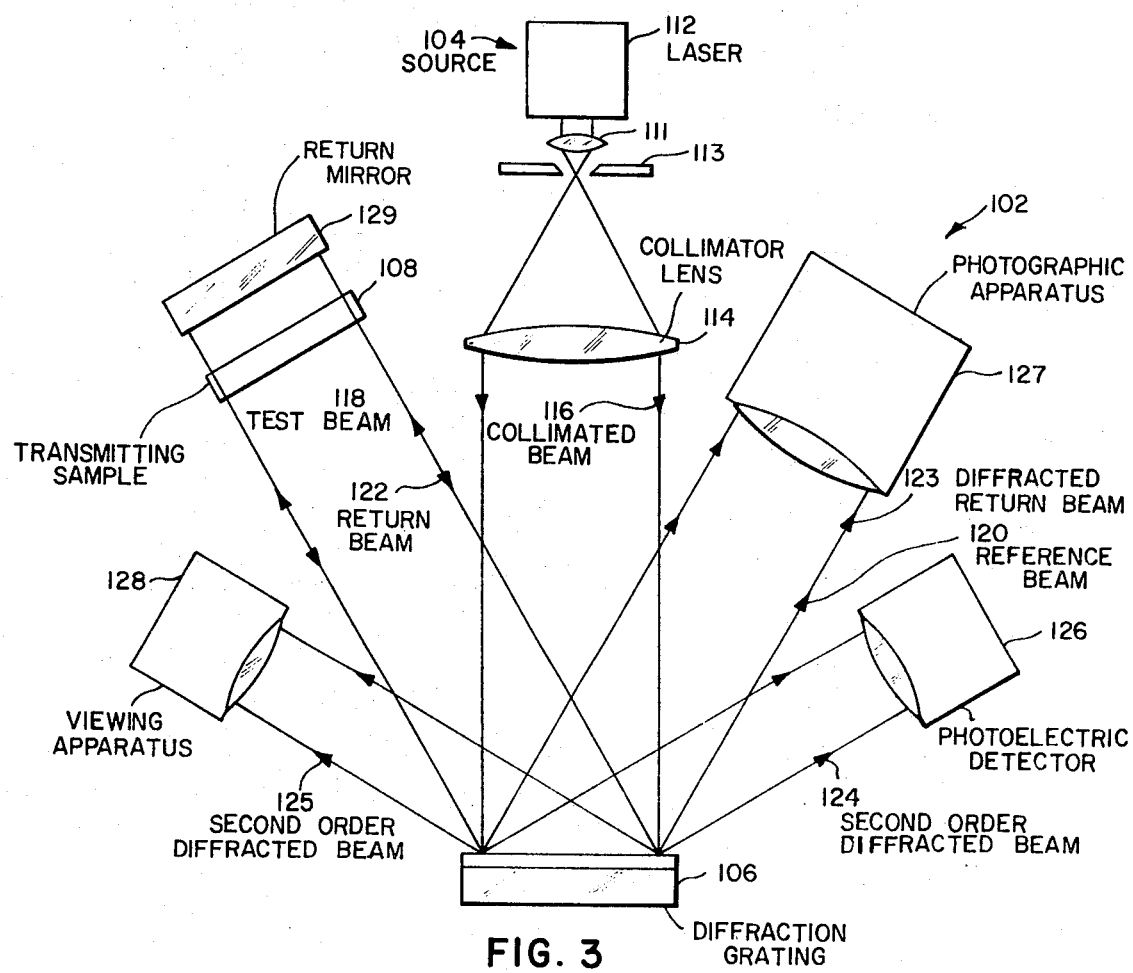
FIGS. 3 and 4 are schematic diagrams of other preferred embodiments of the invention.

FIG. 1 shows a laser interferometer 2 according to the present invention comprising a radiation source 4, a diffraction grating 6, a test mirror 8, and a ground glass diffuser 10. The radiation source 4 is shown schematically as a laser 12, a lens 11, and an aperture 13; the nature of source 4 will be fully understood by one skilled in the art and need not be described in detail here. A collimator lens 14 (which may also be an expander lens) produces a collimated and preferably an expanded source beam 16. The collimated beam 16 is directed normal to the surface of the diffraction grating 6 and the collimated beam 16 is diffracted into a test beam 18 and a reference beam 20 (some of the collimated beam radiation is returned to the collimator lens 14 by the zero order reflection as will be described in more detail hereinbelow). The test beam 18 is reflected from the test mirror 8 producing a return beam 22 directed onto the diffraction grating 6 at an angle such that a diffracted return beam 23 is produced by the diffraction grating 6, that coincides with the reference beam 20. Interference can be observed between the reference beam 20 and the diffracted return beam 23 at the ground glass diffuser 10.

In one application of the interferometer 2, an interference pattern was observed visually at the ground glass diffuser 10 using a 0.6328 $\pi$m. He-Ne laser source and a diffraction grating with 1200 lines/mm. The test mirror 8 was a plane mirror. In another application, the interference pattern was recorded with a photographic plate in place of the ground glass diffuser 10.

In FIG. 1, the collimated beam 16 is diffracted into positive and negative orders which satisfy the equation $$\sin \theta = m \lambda N, \qquad 1.$$

where $\theta_d$ is the angle of diffraction measured from the diffraction grating 6 normal, $\lambda$ is the wavelength of the incident radiation, $N$ is the number of lines per unit length on the diffraction grating 6, and $m$ is the positive or negative integer order number. Some of the incident radiation is returned to the collimator lens 14 by the zero order reflection.

The number of lines per unit length on the diffraction grating 6 is preferably selected to allow only the zero order and the positive first and negative first orders to be present. Thus, energy diffracted outside the useful domain of the instrument is eliminated. The required condition is that $$1/(2) < N < 1/\lambda. \quad 2.$$

In order to have the maximum effective aperture, the value of $N$ should be selected near to the value $$N = 1/(2\lambda) \quad 3.$$

The effective aperture is the width of the test beam 18 in the test arm of the interferometer and is given by $$W = W' \cos \theta_d, \quad 4.$$

where $W'$ is the width of the collimated beam 16 incident on the diffraction grating 6.

Regarding the above discussion concerning selecting only the zero order and the positive first and negative first orders, it is noted that such is not essential. In certain applications of the interferometer of the present invention, the additional beams can be useful, for example, to monitor the energy or the wavelength of the source.

FIG. 3 shows such an arrangement closely paralleling FIG. 1 except for use of additional diffracted beams. The reference numbers for the elements in FIG. 3 are increased by 100 from the comparable reference numbers used in FIG. 1. Hence the interferometer 102 shown in FIG. 3 has a light source 104 including a laser 112, a lens 111, an aperture 113, and a collimator lens 114, producing a collimated beam 116 normally incident on diffraction grating 106. A diffracted, first order test beam 118 is directed through a transmitting sample 108 and reflected back from mirror 129 as a return beam 122 incident on diffraction grating 106. Another first order diffracted beam 120 serves as a reference beam directed toward photographic apparatus 127 used to detect interference. Return beam 122 is reflected or diffracted from the surface of diffraction grating 106 to produce diffracted return beam 123 coincident with reference beam 120 to produce interference detectable with photographic apparatus 127.

A second order diffracted beam 124 is monitored by photo electric detector 126, and another second order diffracted beam 125 is intercepted by a viewing apparatus 128 for observing interference. The use of second order diffracted beams 124 and 125 for auxiliary operations with the interferometer will be well understood by those skilled in the art.

For a grating with symmetrical groove shape, the positive and negative orders will have equal intensities; however, for a blazed grating, the intensity ratio will depend on the angle of the groove surfaces. As much as 60 percent to 70 percent of the total energy of the incident beam 16 can be diffracted into a single order. To better equalize the energy of the two output beams 20 and 23, it is necessary to use the blazed direction for the test beam 18 in the test arm of the interferometer 2. This order will be designated the positive first order.

The test mirror 8 reflects the test beam 18 as a return beam 22 back onto the diffraction grating 6 at an angle $\theta'_t$. This return beam is diffracted at angles $\theta'_d$ given by $$\sin \theta'_d = m'\lambda N - \sin \theta'_t, \quad 5.$$

where $m'$ is the order number associated with the return beam. When the test mirror 8 is normal to the positive first order, $\theta'_t = \theta_d$. Equation (5) can then be written $$\sin \theta'_d = \lambda N(m'-1). \quad 6.$$

Equation (6) has the same form as Equation (1) with $m' = m+1$

The angles of diffraction for the return beam 22 then correspond to the same directions as those of the normal, collimated beam 16, with the order number increased by one unit. The zero order of the return beam 22 coincides with the negative first order of the collimated beam 16, and the positive first order of the return beam 22 coincides with the zero order of the collimated beam 16. The return beam 22 also has a positive second order which is diffracted back toward the test mirror 8. This latter beam gives rise to a weak multiple beam effect with as many as 10 reflected beams having been observed.

The interference is observed between the negative first order of the normal incident beam 16 and the zero order of the return beam 22 (i.e. the diffracted return beam 23). Since the zero order diffracted beam is used, the diffraction grating 6 can be treated as a plane mirror; thus, no aberrations are introduced when the return beam 22 is not plane. Also, wavefront errors introduced by errors in the figure of the diffraction grating 6 substrate are not as critical as with a conventional beam-splitter. For the diffraction grating 6, a surface deviation $h$ introduces a wavefront error of $$\delta = 2h \cos \theta_d \quad 7.$$

whereas a conventional beam-splitter between two media with indices $n$ and $n'$ introduces an error of $$\delta = 2h(n+n') \cos \theta \quad 8.$$

where $\theta$ is the angle of incidence. Since $\theta \approx \theta_d$, the ratio $\delta'/\delta$ is about 2.5 for a glass to air beam-splitter, but it can be as high as 5 for some infrared materials. For a cube type beam-splitter the ratio can range from 3 to 8 depending upon the material used.

The total optical path difference between the test beam and the reference beam is equal to twice the optical distance from the grating to the test object. This distance will range from a few centimeters to several meters, depending on the aperture and the type of object being tested. The coherence length of the source must be greater than this distance.

FIG. 2 shows another preferred embodiment of the present invention comprising an infrared laser interferometer 30 including an infrared laser radiation source 32 (schematically shown as a laser 33, lens 35 and aperture 37), a collimator mirror 34, a diffraction grating 36, a test mirror 38, an imaging mirror 40, and a plane of observation 42. Radiation from the source 32 is collimated by the collimator mirror 34, producing a collimated beam 44 which is directed upon the diffraction grating 36 and is diffracted into a test beam 46 and a reference beam 48. The test beam 46 is directed onto the test mirror 38 and is reflected thereby as a return beam 50 which is directed onto the diffraction grating 36 at an angle so as to produce a diffracted return beam 51 that coincides with the reference beam 48. An interference pattern between the diffracted return beam 51 and the reference beam 48 was produced by the imaging mirror 40 at the plane of observation 42.

In one example of operation of this embodiment of the present invention a spherical surface having a radius of 229 cm. was used as the test mirror 38. The distance from the test mirror 38 to the diffraction grating was 0.5 meters, and the focal length was 67 cm. One to one magnification was used. A $CO_2$ laser source 32 having a wavelength of 10.6 $\mu$m. was used with the diffraction grating 36 having 50 lines/mm. The fringe pattern was formed on a membrane coated with a liquid crystal material and was photographed with white light illumination at the plane of observation 42.

Multiple interference patterns are encountered when the laser is not operating at a single wave length. These different patterns are due to a dispersion of the diffraction grating which causes the interferometer not to be aligned at one wavelength when it is aligned at another. This problem was solved with the $CO_2$ laser by monitoring the spectrum in the back focal plane of the imaging mirror 40 and by adjusting the laser for a single wavelength output.

Regarding both of the above embodiments of FIGS. 1 and 2, with a source of radiation having a long coherence length, such as with a laser, an interference pattern can be observed in any plane where the refracted return beam and the reference beam overlap. However, for strongly irregular wavefronts the shape of the interference pattern will change with position. The proper fringe shape is obtained by imaging the test surface onto the recording plane. When the wavefront deformation is only a few wavelengths, the change in the shape of the pattern can usually be neglected and can be recorded in any overlapping plane.

Figure 4:
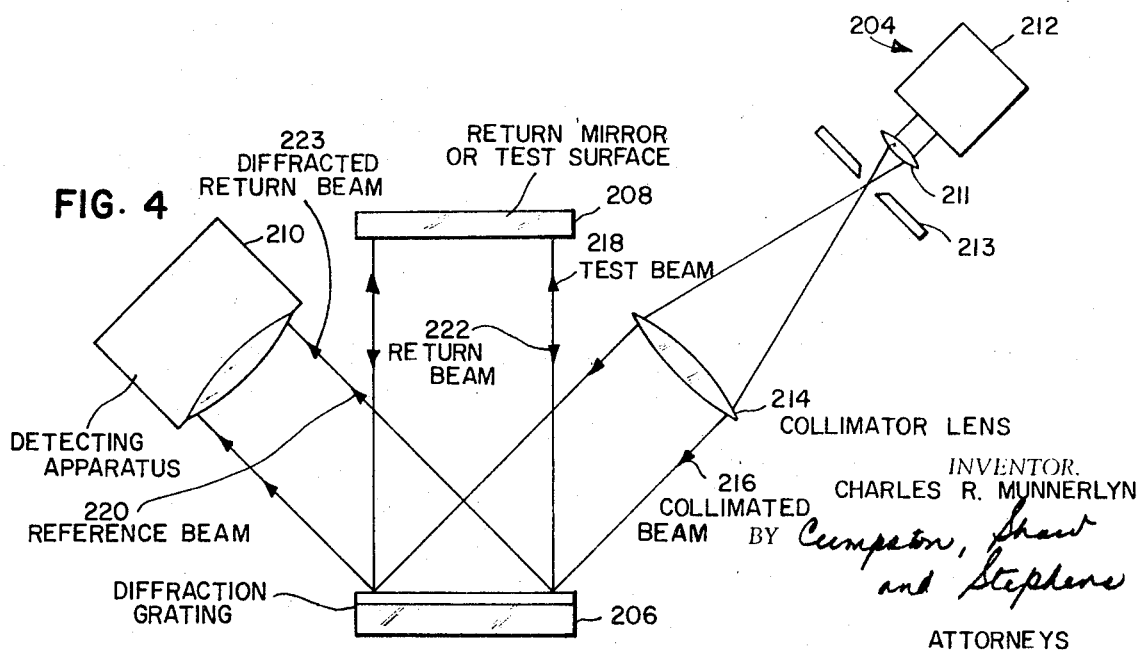

While the present invention has been described in detail above with respect to two preferred embodiments thereof, it is to be understood that the concept and the spirit of the present invention is not limited thereto but that various changes and modifications can be made in the above described preferred embodiments as will be understood by one skilled in the art. For example, the interferometer of the present invention is useful with any radiation including the visible, infrared, and ultraviolet spectral regions. Further, the incident beam is preferably collimated but this is not essential, and the diffraction grating is preferably plane although it can be concave or convex. When using a concave diffraction grating a point source of radiation can replace the collimator. A concave grating can thus be used, but astigmatism will be present. The interferometer of the present invention has been used and is easy to align in both the visible and infrared spectral regions. This interferometer is simple to adjust since only one element is involved. The interferometer of the present invention is not dependent on any particular manufacturing method for the diffraction grating. Further, while the preferred directions for the collimated beam have been discussed above it should be noted that the above described direction of the beams can be varied, for example, the incident collimated beam can be directed onto the diffraction essential, and from what is shown in the drawings as the direction of the test beam, and the test beam can be positioned in the position occupied in the drawings of the collimated beam. FIG. 4 shows such an arrangement in an interferometer 202 comparable to the interferometer of FIG. 1 and having corresponding elements identified by reference numbers increased by 200 from the reference numbers of FIG. 1. Hence, a light source 204 including a laser 212, a lens 211, an aperture 213, and a collimator lens 214, forms a collimated beam 216 incident on the surface of diffraction grating 106 at an acute angle. Beam 216 is diffracted to produce a test beam 208 normally incident on return mirror or test surface 208 from which it is reflected as a return beam 222 normally incident on diffraction grating 206. The zero order diffraction or reflection of collimated beam 216 produces reference beam 220 incident on interference detecting apparatus 210. Return beam 222 is diffracted by diffraction grating 206 to produce a diffracted return beam 223 coincident with reference beam 220 and incident on detecting apparatus 210 to produce interference. This interferometer works most efficiently with blazed diffraction gratings but such are not essential. Further, as stated above this interferometer can be used for visual, thermal, photographic, or electronic image formation and viewing. Any known means can be positioned in the coinciding reference beam and diffracted return beam for observing and/or recording interference fringes produced between said reference beam and said diffracted return beam. The interferometer of the present invention can be used for all purposes for which known interferometers can be used. While the test optical systems shown in FIGS. 1 and 2 were both mirrors, it is to be understood that the interferometer of the present invention can be used in all applications of interferometry, including testing both reflecting and transmitting optical systems. When the optical system to be tested is of the transmission type, then a reflecting mirror is positioned beyond the test optical system for reflecting the test beam, as a return beam, back to the diffraction grating at such an angle that a diffracted return beam is produced that coincides with the reference beam to produce interference fringe patterns that can be observed or recorded at the plane of observation. Other important applications of the interferometer of this invention include measuring the homogeneity of materials by placing a single flat element in the test arm with a mirror behind it, and, also measuring the surface profile of optically rough surfaces. The term "test object" is used generically herein to mean the object positioned in the test beam, whether the test object is being tested, measured, used for demonstration purposes, or whatever. Also, the generic phrase that "the test beam traverses the test object" used herein means that it passes through a transmission type test object, and that it reflects off of a reflecting test surface; in other words, it means that the test beam has been completely acted upon, optically, by the test object.

Regarding the manufacture of the diffraction grating (such as the diffraction gratings 6 and 36 of FIGS. 1 and 2 respectively), gratings are normally made with straight lines of equal spacing. However, this invention can use diffraction gratings made with nonstraight lines, lines with nonuniform spacing, and/or lines of nonuniform width. The purpose of changing the shape and spacing of the lines is to modify the shape of the diffracted wavefront. A similar purpose can be achieved by modifying the figure of the grating substrate. The modified line shapes can be produced by mechanical techniques or by recording photographically a series of lines produced, for example, by the interference of two light beams (such as an interferrogram). All of the above are merely examplary of some of the different types of diffraction gratings; all diffraction gratings are intended to be included in the term "diffraction grating" as used in the present specification and claims.

Reference is hereby made to a description of the present invention in "Applied Optics," Apr. 1969, Vol. 8, No. 4, starting at page 827.

I claim:
1. An interferometer comprising:
 a. a source of radiation for producing a source beam of sufficient coherence length to produce useful interference;
 b. a diffraction grating positioned to receive said source beam for diffracting it into a test beam and a separate reference beam, said reference beam having substantially zero path length prior to recombination thereof with said test beam; and
 c. a test object positioned to receive said test beam and to reflect said test beam, as a return beam, back to said diffraction grating at an angle such that said diffraction grating produces a diffracted return beam interfering in coincidence with said reference beam.
2. The interferometer according to claim 1 including means positioned in said coinciding reference beam and diffracted return beam for observing and/or recording interference fringes produced between said reference beam and said diffracted return beam.
3. The interferometer according to claim 1 wherein said source of radiation is an infrared laser.
4. The interferometer according to claim 1 including a collimator for producing a collimated source beam from said source of radiation to said diffraction grating.
5. The interferometer according to claim 4 wherein said diffraction grating is positioned to receive said collimated beam normal to said diffraction grating.
6. The interferometer according to claim 1 wherein said diffraction grating includes that number of lines per unit length which allows only the zero order and the positive and negative first orders of said source beam to be diffracted.
7. The interferometer according to claim 6 wherein said source beam has a wavelength of 10.6 μm. and said diffraction grating has 50 lines/mm.
8. The interferometer according to claim 1 wherein said diffraction grating includes a blazed grating and in which the blazed direction is that of said test beam.
9. The interferometer according to claim 1 wherein said beam coincident with said reference beam is the zero order reflection of said return beam from said diffraction grating.
10. The interferometer according to claim 1 including a collimator for producing a collimated source beam from said source of radiation to said diffraction grating; and wherein: said radiation source is an infrared laser, said diffraction grating is positioned to receive said collimated beam normal to said diffraction grating; said diffraction grating includes that number of lines per unit length which allows only the zero order and the positive and negative first orders of said source beam to be diffracted; and said diffracted return beam is the zero order diffracted return beam.
11. In an interferometer having a radiation source of sufficient coherence length to produce useful interference, the improvement comprising:
 a. a diffraction grating arranged so a beam from said source is incident on said diffraction grating;

b. said diffraction grating being lined relative to the wave length of said source to produce at least a test beam and a reference beam at angles to each other and to said source beam;

c. a test object arranged in the path of said test beam to reflect said test beam back to said diffraction grating as a return beam; and d. said return beam being recombined coincidentally in interference with said reference beam, said reference beam having substantially zero path length before said recombination with said return beam.

12. The interferometer of claim 11 wherein the zero order reflection of said return beam is recombined with said reference beam.

13. The interferometer of claim 11 wherein said test and reference beams are reflected from said diffraction grating.

14. The interferometer of claim 13 wherein said source beam is normally incident on said diffraction grating.

15. The interferometer of claim 14 wherein said test and reference beams comprise negative and positive first order beams.

16. The interferometer of claim 11 wherein said source beam is incident on said diffraction grating at an angle such that one of said produced beams is substantially normal to said diffraction grating.

17. The interferometer of claim 16 wherein said diffraction grating is reflective.

18. The interferometer of claim 11 wherein said test and reference beams comprise negative and positive first order beams.

19. The interferometer of claim 18 wherein said diffraction grating produces beams in addition to said negative and positive first order beams for use in auxiliary operations with said interferometer.

20. The interferometer of claim 18 wherein said diffraction grating is blazed in the direction of said test beam.